United States Patent
Eguchi et al.

(10) Patent No.: US 9,612,989 B2
(45) Date of Patent: Apr. 4, 2017

(54) COMPUTER SYSTEM AND ROUTING CONTROL METHOD

(75) Inventors: Shuhei Eguchi, Hadano (JP); Ryo Yamagata, Sagamihara (JP); Takashi Todaka, Tokyo (JP)

(73) Assignee: HITACHI, LTD. (JP)

( * ) Notice: Subject to any disclaimer, the term of this patent is extended or adjusted under 35 U.S.C. 154(b) by 866 days.

(21) Appl. No.: 13/997,539

(22) PCT Filed: Dec. 24, 2010

(86) PCT No.: PCT/JP2010/073395
§ 371 (c)(1),
(2), (4) Date: Sep. 12, 2013

(87) PCT Pub. No.: WO2012/086068
PCT Pub. Date: Jun. 28, 2012

(65) Prior Publication Data
US 2014/0006679 A1    Jan. 2, 2014

(51) Int. Cl.
G06F 13/40    (2006.01)
H04L 12/935   (2013.01)
G06F 13/36    (2006.01)

(52) U.S. Cl.
CPC ......... G06F 13/4022 (2013.01); G06F 13/36 (2013.01); H04L 49/30 (2013.01)

(58) Field of Classification Search
CPC ............................ H04L 49/30; G06F 13/4022
See application file for complete search history.

(56) References Cited

U.S. PATENT DOCUMENTS

| 6,901,451 | B1 | 5/2005 | Miyoshi et al. |
| 7,293,129 | B2 | 11/2007 | Johnsen et al. |
| 7,565,463 | B2 | 7/2009 | Johnsen et al. |
| 2014/0269754 | A1* | 9/2014 | Eguchi ............... G06F 13/4022 370/419 |

FOREIGN PATENT DOCUMENTS

| JP | 10-112726 A | 4/1998 |
| JP | 2002-149592 A | 5/2002 |
| JP | 2008-181389 A | 8/2008 |

* cited by examiner

Primary Examiner — Glenn A Auve
(74) Attorney, Agent, or Firm — Volpe and Koenig, P.C.

(57) ABSTRACT

The present invention eliminates the shortage of bus numbers in routing control using PCIe switches. A system port address (SPA) is associated with a destination bus number and is assigned to a port (external port) connected to a server and a device. When packets sent from the server or the device are received at the external port, the system port address (SPA) corresponding to the destination bus number having the packets is determined, and the SPA is added to the packets as a label. This SPA is used to route the packets sent between ports (internal ports) that connect switches. When the packets arrive at the external port to which the target server or device is connected, the destination bus number having packets is used to send the packets to the server or device connected to the external port.

13 Claims, 12 Drawing Sheets

FIG. 8

MANAGEMENT INFORMATION 503

PORT SETTING INFORMATION TABLE

| PHYSICAL SWITCH NUMBER | PORT NUMBER | SPA | RANGE REGISTER SETTING |
|---|---|---|---|
| 0 | 0 | 50 | 50-50 |
| 0 | 1 | — | 60-69 |
| 0 | 2 | — | 70-79 |
| 1 | 0 | — | 50-59 |
| 1 | 1 | 60 | 60-60 |
| 1 | 2 | 61 | 61-61 |
| 2 | 0 | — | 50-59 |
| 2 | 1 | 70 | 70-70 |
| 2 | 2 | 71 | 71-71 |

600 — PHYSICAL SWITCH NUMBER
601 — PORT NUMBER
602 — SPA
603 — RANGE REGISTER SETTING
504

Bus#-SPA CONVERSION TABLE 302

| Bus# | SPA |
|---|---|
| 0 | 50 |
| 1 | — |
| 2 | 60 |
| 3 | 61 |
| 4 | 70 |
| 5 | 71 |
| ... | ... |

COMPUTER SYSTEM AND ROUTING CONTROL METHOD

TECHNICAL FIELD

The present invention relates to a computer system and a routing control method, and more particularly, to routing control for packet transfer in a computer system in which a plurality of servers are connected to an I/O device, and the like, by a plurality of switches.

BACKGROUND ART

In general, InfiniBand is known as the high-speed data communication method between server chassis. In order to use the InfiniBand it is necessary to prepare an additional switch for InfiniBand, so that the cost of the implementation is high. In recent years, in order to overcome this problem, PCI Express (hereinafter referred to as PCIe) has been put into practical use as a high-speed communication method between servers and devices. The PCIe allows low-cost communication between servers and devices connected to slots within the chassis.

In large-scale data centers and highly reliable computer systems, there is a demand to connect a large number of PCIe devices to a single server for the redundancy and load balancing. In order to connect a large number of PCIe devices, it is necessary to connect an expansion chassis, such as an I/O drawer, to the server chassis. If a PCIe switch is prepared in each chassis, a large number of PCIe switches are present in the entire server system.

PCIe is a high-speed serial interface (IF) which is Point-to-Point connection, imitating the bus configuration of PCI using PCIe switches to ensure compatibility with the existing PCI standard. In general, the bus configuration is a configuration in which each of the devices and switches are connected to each other by a bus through a bridge present in the port portion of the switch. Further, there is a virtual bus in the switch to connect the bridges of the individual ports of the switch.

In a computer system in which a server, a PCIe switch, and a device are connected to each other by PCIe buses, in general, a bus number is given to all the buses for the purpose of performing routing. The PCIe routing method includes three types of routing: ID routing, address routing, and implicit routing.

In the ID routing, the bridge stores three bus numbers: Primary (the bus number connected to the upstream side), Secondary (the bus number connected to the downstream side), and Subordinate (the largest bus number of the sub-tree of buses connected to the downstream side). Then, the ID routing performs routing by the following method. That is, when a transaction layer packet (hereinafter referred to as TLP) is outputted from a certain device, the TLP is first input to the bus to which the device is connected. All the bridges connected to the bus check the bus number written in the TLP input to the bus. Then, the bridges allow the TLP to pass through under the following conditions. If the bus number is between Secondary and Subordinate, the TLP is allowed to pass through in the downstream direction (from the server to the device). If the bus number is not between Secondary and Subordinate, the TLP is allowed to pass through in the upstream direction (from the device to the server). This repetition makes it possible to send the TLP to the target device and server.

In the address routing, the bridge stores the address range. If the destination address of the TLP input to the bus is in the address range stored in the bridge, the TLP is allowed to pass through in the downstream direction. If the destination address of the TLP is out of the address range stored in the bridge, the TLP is allowed to pass through in the upstream direction. Further, in the implicit routing, the routing method is defined according to the type of TLP, so that the switch performs routing based on the type of TLP.

Proper routing requires that the bus number stored in the bridge should match the physical topology. Thus, the numbering of the bus number depends on the physical connection configuration of the switch, so that the bus number may not be freely assigned.

An example of the numbering method of the bus number according to the physical topology is shown in FIG. 12. The numbering method of the bus number should match the topology of the PCI bus. Thus, in addition to a bus number 402 for connecting a server 101 and a device 104 to a PCIe switch 113, it is also necessary to assign a bus number 403 to a bus within the physical switch and to a bus between the switches. As a result, a large number of bus numbers are consumed. However, the upper limit of the bus number that can be used for a single computer system is determined to be 256. The bus number is finite in a single computer system.

In a server system including a large number of PCIe switches, such as a large scale data center or a highly reliable computer system, a large number of buses are present within a switch and between switches. Thus, many bus numbers are likely to be consumed in a place where the user of the server system does not intend, such as, for example, in the bus within a switch and the bus between switches.

When many bus numbers are consumed in the bus within a switch and the bus between switches, the bus number that can be assigned to the place where the user of the server intends, for example, the bus between the switch and the device, is reduced. This leads to a problem of a shortage of bus numbers. In addition, if the shortage of bus numbers occurs, it may be difficult to connect devices more than the maximum number of bus numbers, so that the number of devices that can be connected in the whole system is reduced.

Note that Patent Documents 1 and 2 disclose a control method for converting a destination address into other information by using a conversion table, adding the information to TLP as the additional header, and routing the TLP by using the additional header.

CITATION LIST

Patent Document 1: U.S. Pat. No. 7,293,129
Patent Document 2: U.S. Pat. No. 7,565,463

SUMMARY OF THE INVENTION

Technical Problem

In the routing control described in Patent Documents 1 and 2, each switch performs routing by also using the additional header information. However, the switch performs not only routing using the additional header information, but also routing using the bus number and address according to the standard of PCIe. Thus, even in the routing control described in Patent Documents 1 and 2, the numbering method of the bus number is not free from the topology of the switch, so that it is still necessary to assign a bus number to the bus between switches or a bus within a switch. As a result, the problem of the shortage of bus numbers still remains.

An object of the present invention is to solve the shortage of bus numbers in routing control using PCIe switch. More specifically, the present invention is to route TLP by using a unique symbol (called a system port address (SPA)) in the whole system, between ports connected to a device or a server, of the ports of the PCIe switch.

Solution to Problem

A computer system according to the present invention is preferably a computer system in which a server and one or a plurality of devices are connected to each other by a plurality of PCIe switches each having a plurality of ports. The computer system sends packets between the server and the device through the port of the PCIe switch. The PCIe switch includes: conversion means for converting a destination bus number into a system port address (SPA) associated with the destination bus number and assigned to a port (external port) of the ports that is connected to the server or the device; and SPA set setting means for setting a set of SPAs so as to include the SPA of the external port that is connected to the destination of the external port. When the external port receives a packet sent from the server or the device, the PCIe switch obtains the SPA corresponding to the destination bus number held by the packet by referring to the conversion means, and adds the SPA to the packet as a label. Then, the PCIe switch determines the set of SPAs specified by the SPA set setting means based on the SPA added to the packet, and sends the packet to the port included in the destination of the SPA. When the packet arrives at the external port to which the target server or device is connected, the PCIe switch sends the packet to the server or device connected to the external port by using the destination bus number held by the packet.

In the computer system of the preferred example, a set of SPAs specified by the SPA set setting means is in the range of the SPA to be the destination of the packet that can pass through the external port from the inside of the switch to the outside. Further, each of the external ports has a register for storing the SPA indicating that the own port is the external port. Further, preferably the contents of the conversion means, the SPA set setting means, and the register are set in the initial setting by a management system connected to the plurality of PCIe switches.

Further, in the preferred example, a port (first port) of one switch (first switch) is connected to a port (second port) of another switch (second switch). When a switch other than the first switch is connected to the second switch, a set of SPAs is set to the SPA set setting means of the first port, so as to include the SPA of the ports of the second switch and the next switch. When a switch other than the first switch is not connected to the second switch, a set of SPAs is set to the SPA set setting means of the first port, so as to include the SPA of the port of the second switch. When the packet with the destination SPA included in the set of SPAs set by the SPA set setting means of the first port is input to the first switch, the computer system sends the packet to the second switch by allowing the packet to pass through the first port and the second port in this order.

Further, in the preferred example, an accessible set including the plurality of external ports is defined within the computer system. Further, a unique bus number is assigned to each of the external ports in the accessible set. When a packet with the specified destination bus number is input to the external port from the outside of the switch, the computer system sends the packet by using the SPA obtained by the conversion means as the destination of the packet.

Further, preferably, in the external port receiving the packet with the specified bus number, the packet is outputted to the outside of the switch after the SPA added to the packet is removed in the destination port specified in the SPA. Further, preferably, the computer system includes a plurality of servers, and the accessible set is defined for each server.

Further, preferably, the external port is included in the plurality of accessible sets, so that the device connected to the external port transmits and receives the packet to and from the plurality of servers. Further, preferably, the SPA and the bus number are represented in binary numbers. The binary number representing the SPA is set higher than the binary number of bits representing the bus number, in order to connect a larger number of devices and a larger number of servers as a single computer system.

A routing control method according to the present invention is preferably a routing control method of packets in a computer system for sending packets between a server and one or a plurality of devises by PCIe switches each having a plurality of ports. The routing control method includes the steps of: assigning a system port address (SPA) associated to a destination bus number to a port (external port) of the ports that is connected to the server and the device; when the external port receives a packet sent from the server or the device, obtaining the system port address (SPA) corresponding to the destination bus umber held by the packet and adding the obtained SPA to the packet as a label; routing the packet to be sent between ports (internal ports) connecting the PCIe switches based on the SPA; and when the packet arrives at the external port to which the target server or device is connected, sending the packet to the server or device connected to the external port by using the destination bus number held by the packet. In the preferred example, the routing control method obtains the SPA from the destination bus number held by the packet that arrived at the external port, by referring to a conversion table prepared in advance in the external port in which a plurality of pairs of destination bus numbers and SPAs are registered.

Advantageous Effects of Invention

According to the present invention, the routing of TLP between ports connected to a device or a server is performed using SPA, so that there is no need for the numbering of bus numbers to match the physical topology. Thus, it is possible to minimize the assignment of the bus number in a place where the user of the server does not intend, such as within a switch or between switches. In this way, it is possible to solve the shortage of bus numbers in the computer system.

Further, when a plurality of servers access a device through a switch, different bus numbers and SPAS are associated with each of the servers. In this way, it is possible to make different PCIe topologies visible to the software on each server. By using a plurality of PCIe topologies, it is possible to handle more than 256 devices; which is determined to be the upper limit in the whole computer system. Further, when two PCIe switches are connected to each other by a plurality of PCIe buses, the access is switched in determining which PCIe bus is to be used by the lower bit of the SPA. In this way, it is possible to prevent the concentration of access to a single bus and to achieve load balancing.

BRIEF DESCRIPTION OF DRAWINGS

FIG. 8 is a view of the structure of management information in the management system according to the embodiment.

DESCRIPTION OF EMBODIMENTS

Figure 1:
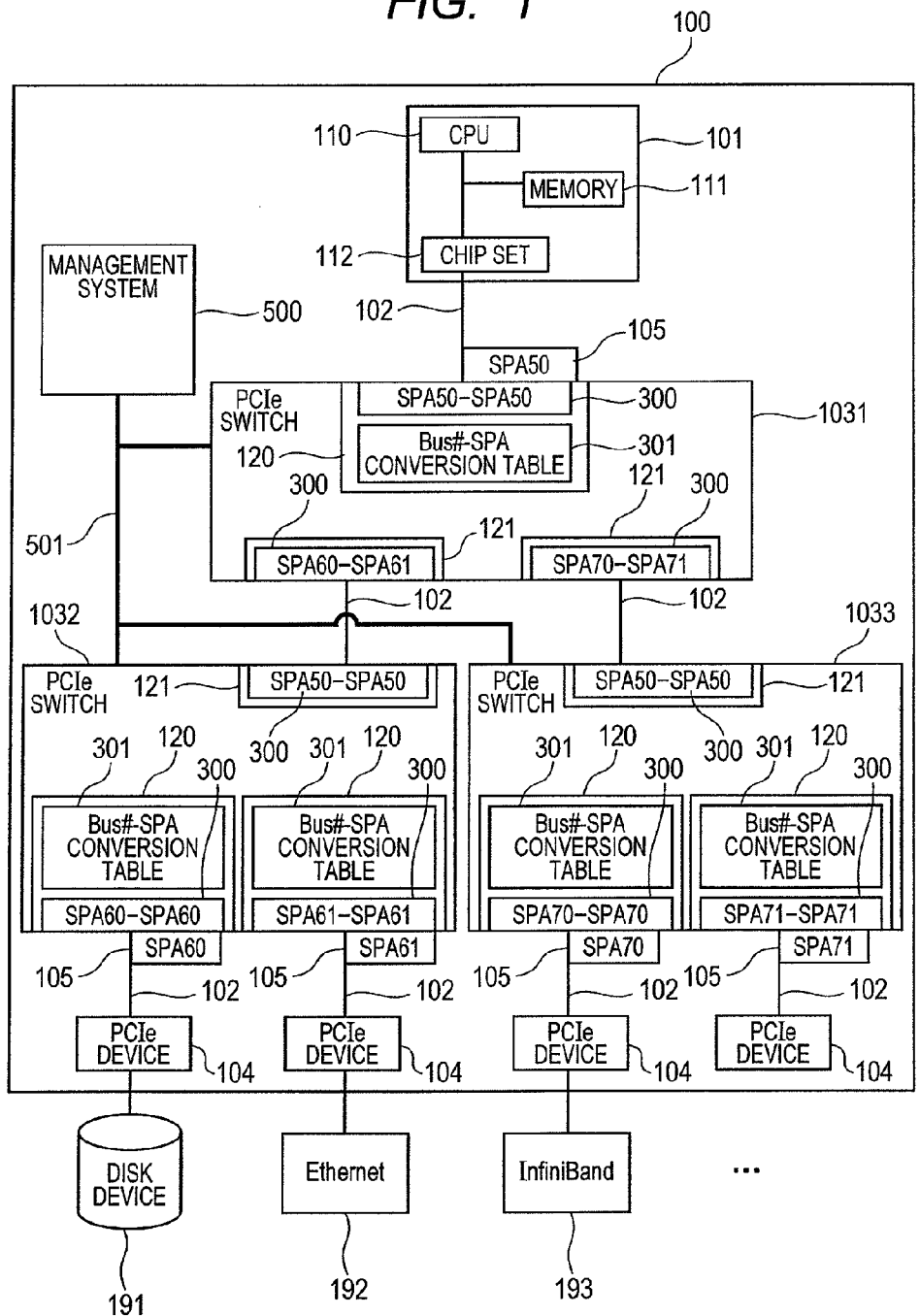
FIG. 1 is a block diagram of a computer system according to an embodiment (first embodiment) of the present invention.

Hereinafter, embodiments of the present invention will be described with reference to the accompanying drawings.
First Embodiment FIG. 1 shows the general configuration of a computer system according to the present embodiment. A computer system 100 includes a server 101, a PCIe switch 1031 connected to the server by a bus 102, PCIe switches 1032 and 1033 (collectively denoted by 103), a plurality of PCIe devices 104 each connected to the PCIe switches 1032 and 1033 by the PCIe bus 102, and a management system 500 connected to each PCIe switch 103. It is to be noted that the components, except the management system 500, may be referred to as a server system.

The server 101 includes a CPU 110, a memory 111, and a chip set 112. Further an I/O device 19, such as a disk device 191, InfiniBand 102, or Ethernet (registered trademark) 193, is connected to the PCIe device 104. The CPU 110 in the server 101 can access the disk device or Ethernet connected to the PCIe device 104 through the chip set 112, the PCIe bus 102, the PCIe switch 103, and the PCIe device 104. Further, the PCIe device 104 can access the other PCIe device 104. In addition, the PCIe device 104 can also access the memory 111 through the chip set 112. The management system 500 is a server having a management processor and the management information, which will be described in detail below with reference to FIG. 7. The management system 500 is connected to each PCIe switch 103 by a path 501 to perform the initial setting of each PCIe switch 103.

There are two types of ports present in the PCIe switch 103. One is a port 120 (referred to as an external port) connected to the server and the PCIe device by the PCIe bus. The other is a port 121 (referred to as an internal port) to which the PCIe switches (the PCIe switch 1031 and the PCIe switches 1032, 1033) are connected to each other by the PCIe bus. A system port address (referred to as SPA) 105 is assigned to the external port 120. The SPA is a unique number statically assigned to all the external ports present in the system. Further, the external port 120 has a conversion table 301 for converting between the bus number and the SPA. On the other hand, the internal port 121 does not have the SPA assigned to it and hence does not have the conversion table.

Each port of the PCIe switch must have SPA set setting means to indicate the set to allow only the TLP belonging to a certain set to pass through from the inside of the PCIe switch to the outside. In the present embodiment, it is assumed to be able to set the range of integers, as the set, from the first integer up to the second integer. This SPA set setting means is a range register 300. The range register 300 can store two integers. In the case of SPA that is included in the range of integers from the first integer up to the second integer set in the range register, the SPA can pass through the external port 120 or the internal port 121 from the inside of the switch to the outside. Note that the TLP can pass through from the outside of the switch to the inside, regardless of the setting of the range register 300. The range of the SPA, which is assigned to the port included in the sub set of the topology of the PCIe connected to the port, is set to the range register 300 by the management system 500. The bus number and the SPA associated to the bus number are stored in the conversion table 301 (see FIG. 3).

The setting of the SPA, the range register, and the conversion table is performed based on the setting information that is stored in the management system 500 in advance in the initial setting, which will be described in detail with reference to FIG. 7. For example, a plurality of types of information are prepared according to the topology as setting information in advance, so that the management system 500 selects which type of information is to be used. It is also possible that the management system automatically detects the topology in the initial setting to automatically generate the setting information of the conversion table and the SPA. However, the present invention is not limited to these examples.

Figure 2:
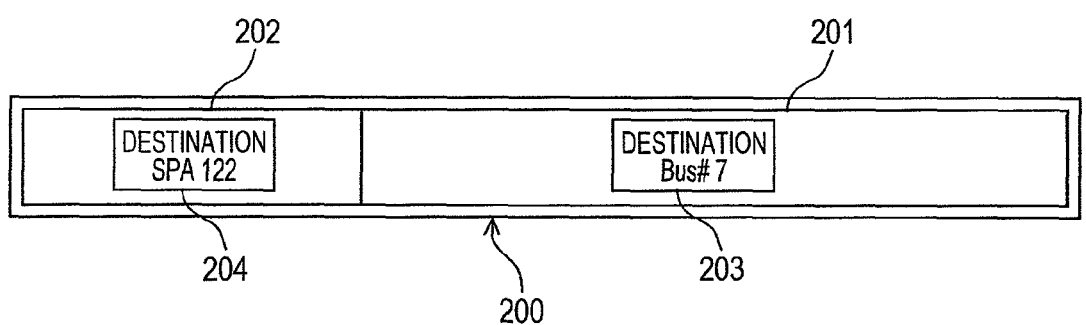
FIG. 2 is a view of the structure of a TLP sent to the PCIe switch network according to the embodiment.

A destination SPA is added to the TLP as a label (see FIG. 2). In the network between the PCIe switches 1031 to 1033, the routing of the packet is performed by using the SPA and not using the bus number. More specifically, the routing is performed by repeating the process of sending the SPA added to the TLP as the label, to the port included in the range of SPAs set in the range register. The SPA is removed when the TLP is outputted from the external port 120. The routing method using SPA will be described more in detail below.

There are three types of routing method in PCIe: ID routing, address routing, and implicit routing. Each routing is performed as follows.
<ID Routing>

When the TLP outputted from the server or the PCIe device arrives at the external port 120, the PCIe switch 103 obtains the destination SPA corresponding to the destination bus number held by the TLP by referring to the conversion table 301. Then, the PCIe switch 103 adds the obtained SPA to the TLP as a label. After that, the TLP is routed by using the SPA within the PCIe switch network. When the TLP arrives at the external port 120 or the internal port 121 in the switch 103 from the outside of the switch, the switch 103 compares the SPA written in the label to the value of the range register of each port in the switch, and sends the TLP to the corresponding port. By repeating this operation, it is possible to send the TLP to the external port 120 connected to the server or the device, which is the destination of the port. When the TLP sent from the other port of the switch arrives at the external port, the PCIe switch 103 removes the SPA in the external port, and then sends the TLP to the destination device.

<Address Routing>

In the address routing, first the size of the entire space to be assigned to the PCIe device in MMIO space is divided by the bus number into equal spaces. The divided address spaces are associated in the order of arrangement from the smallest bus number. In this way, the address of a certain MMIO space can be converted into a bus number by the calculation formula.

When the TLP arrives at the external port 120, the external port 120 converts the destination address written in the TLP into a bus number by the calculation formula. After the address is converted into the bus number, the PCIe switch 103 performs the routing in the same way as in the ID routing.

<Implicit Routing>

In the implicit routing, the method of routing is defined according to the type of TLP, so that each PCIe switch 103 determines individually the routing method based on the type of TLP.

FIG. 2 shows a TLP to be routed in the PCIe switch network. A TLP 200 includes a TLP body 301 and a TLP prefix 202. A field 203 for holding a destination bus number 7 is present in the TLP body 201. In the present embodiment, the routing is performed by using the SPA instead of using the bus number, so that an SPA 122 is added to the TLP as a label. There is a field 204 for the destination SPA in a vendor defined field within the TLP prefix, in order to hold the SPA within the TLP as the additional information. In the network between the PCIe switches, the routing is performed by using the SPA as the label held by the destination SPA field 204 within the TLP prefix, instead of using the bus number.

The port of the PCIe switch 103 includes two types: the external port 120 and the internal port 121. These two types of ports are physically the same. In the initial setting, the management system determines whether the port is a port connected to the server or device, or is a port connecting the switches. Thus, the type of the port is determined.

Figure 3:
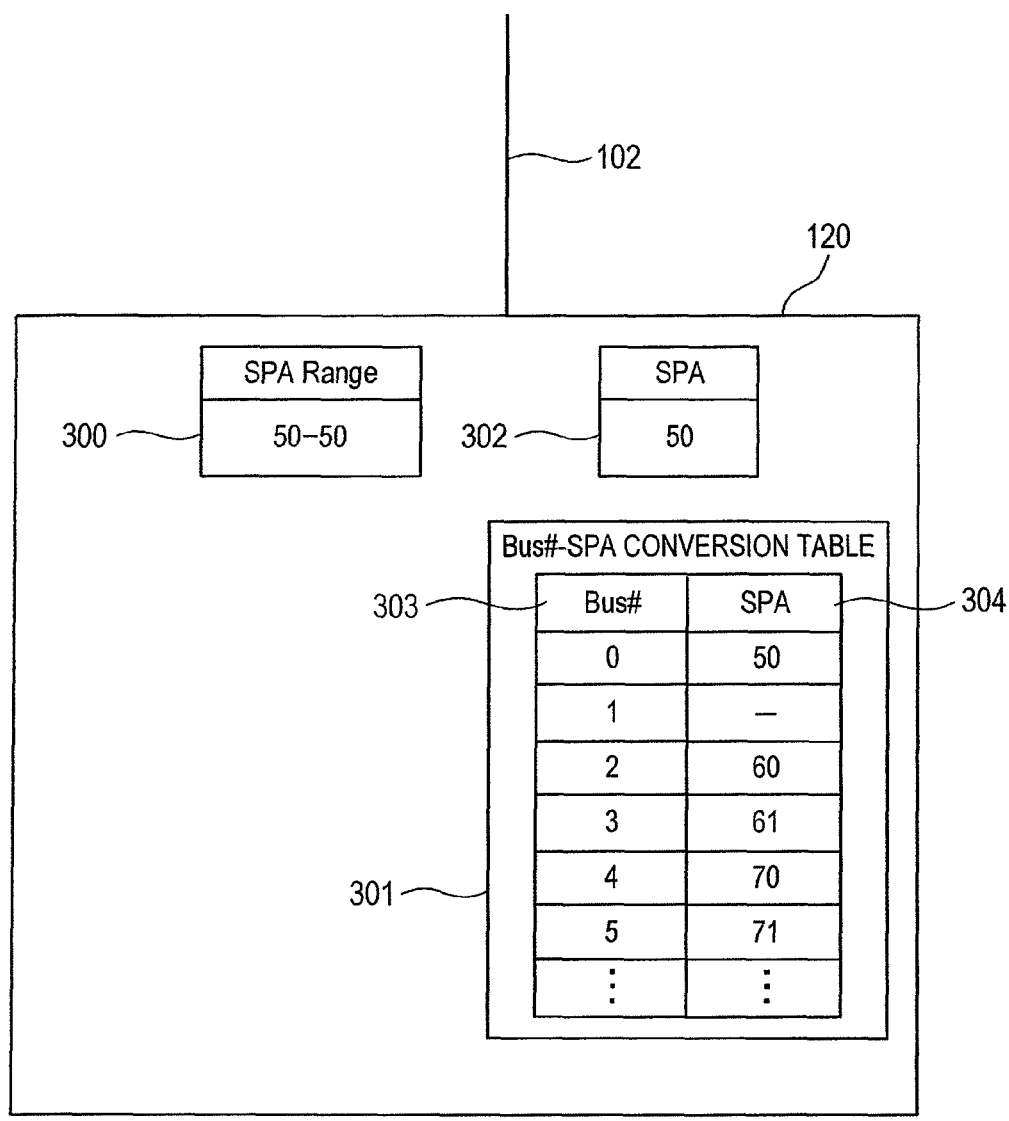
FIG. 3 is a view of an external port of the PCIe switch as well as the structure of a conversion table present in the external port, according to the embodiment.

FIG. 3 shows the configuration of the external port 120 of the PCIe switch. As shown in FIG. 1, the external port is connected to the PCIe device 104 or the server 101 by the PCIe bus 102. The external port 120 includes the range register 300 for indicating the range of SPAs, the conversion table 301, and a register 302 for storing the SPA of the port itself. The PCIe device or the server is the destination of the TLP, so that the SPA should be assigned to the port connected to the PCIe device or the server. The SPA is written in the register 302 in which the SPA of the port itself is stored. Further, the TLP outputted from the PCIe device or the server and input to the port, has no destination SPA label, so that it is necessary to obtain the SPA from the destination bus number written in the destination bus number field 203 present in the TLP body 201. For this reason, the conversion table 301 is provided to convert the SPA from the bus number. Here, the range register 300, the conversion table 301, and the register 302 may be formed in a single memory or may be formed separately in different registers or memories.

The conversion table 301 includes a bus number (Bus#) field 303 and an SPA field 304. The SPA corresponding to the bus number is set in the SPA field. The setting of the SPA is performed by the management system 500 in the initial setting. The SPA can be obtained by referring to the management table 301 by using the bus number as the key. The entry corresponding to a non-existing bus number is invalid. In order to show invalidity, for example, an appropriate value of SPA is set to indicate the invalidity, which is written in the part corresponding to the bus number in advance (for example, the SPA corresponding to the bus number #1 is invalid).

Figure 4:
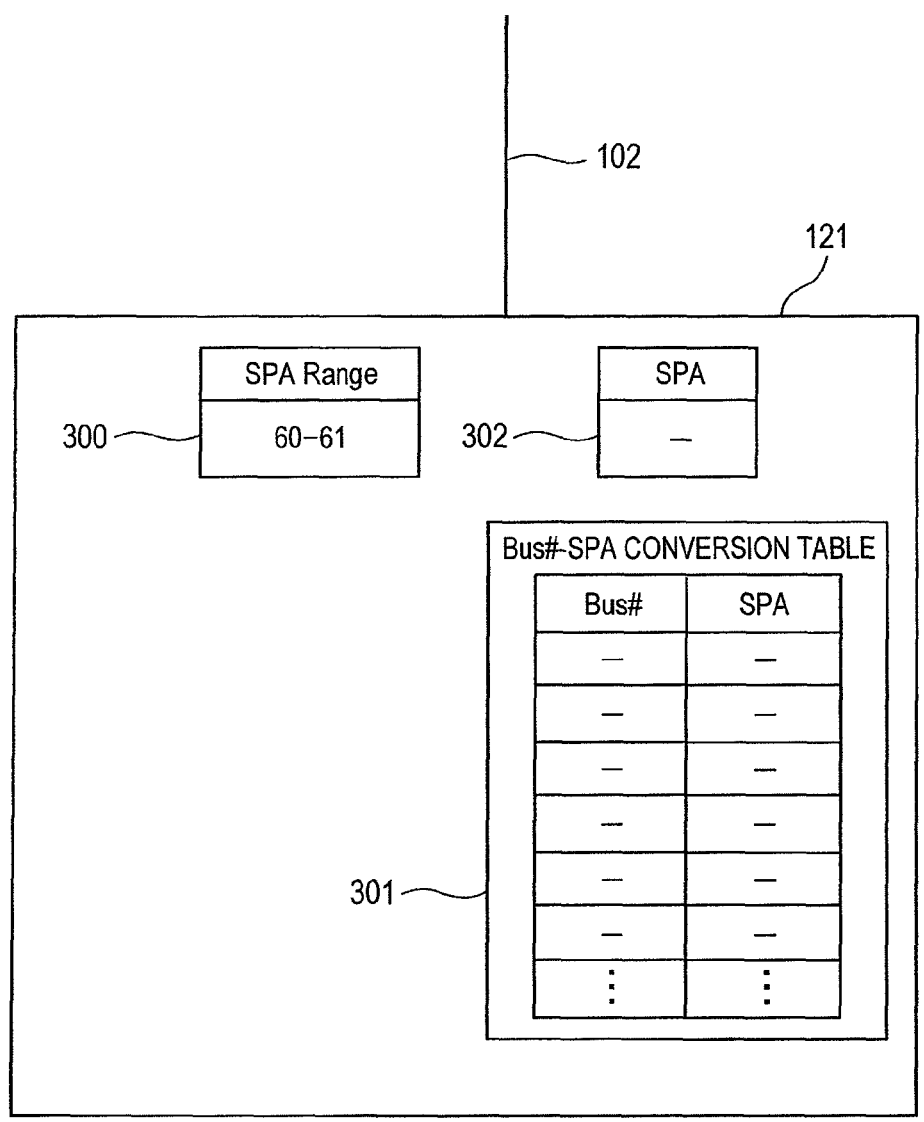
FIG. 4 is a view of the structure of an internal port of the PCIe switch according to the embodiment.

FIG. 4 shows the configuration of the internal port 121 of the PCIe switch. The internal port has mechanistically the same configuration as the external port, and includes the range register 300, the conversion table 301, and the register 302 for storing the own SPA. However, as shown in FIG. 1, the internal port is different from the external port in that the internal port is not connected to the server or the PCIe device which is the receiver or transmitter of TLP, and is connected to an internal port of the other switch by the PCIe bus. Thus, the internal port only allows the TLP to pass through without adding and removing the TLP prefix. For this reason, the management system 500 does not assign the SPA to the internal port in the initial setting. The range register 300 is valid, but the conversion table 301 and the SPA storage register 302 are invalid. In FIG. 4, "-" written in the range register 302 and the conversion table 301 indicates that these fields are invalid.

The range register 300 indicates a set of SPAs used for determining the port to which the TLP with the destination SPA to be sent. In other words, this can be defined as a kind of SPA set selection means. There are several methods of selecting the set in the set selection means. For example, as the set selection means, as described in the present embodiment, one method is to have one or a plurality of mechanisms to select a set of integers in the range from a first integer up to a second integer. Another method is to have one or a plurality of mechanisms to select a set of integers whose remainder when divided by the first integer is equal to the second integer. Further, still another method is to have one or a plurality of mechanisms to select a set of integers in the range from the first integer up to the second integer, whose remainder when divided by a third integer is equal to a fourth integer.

Figure 5:
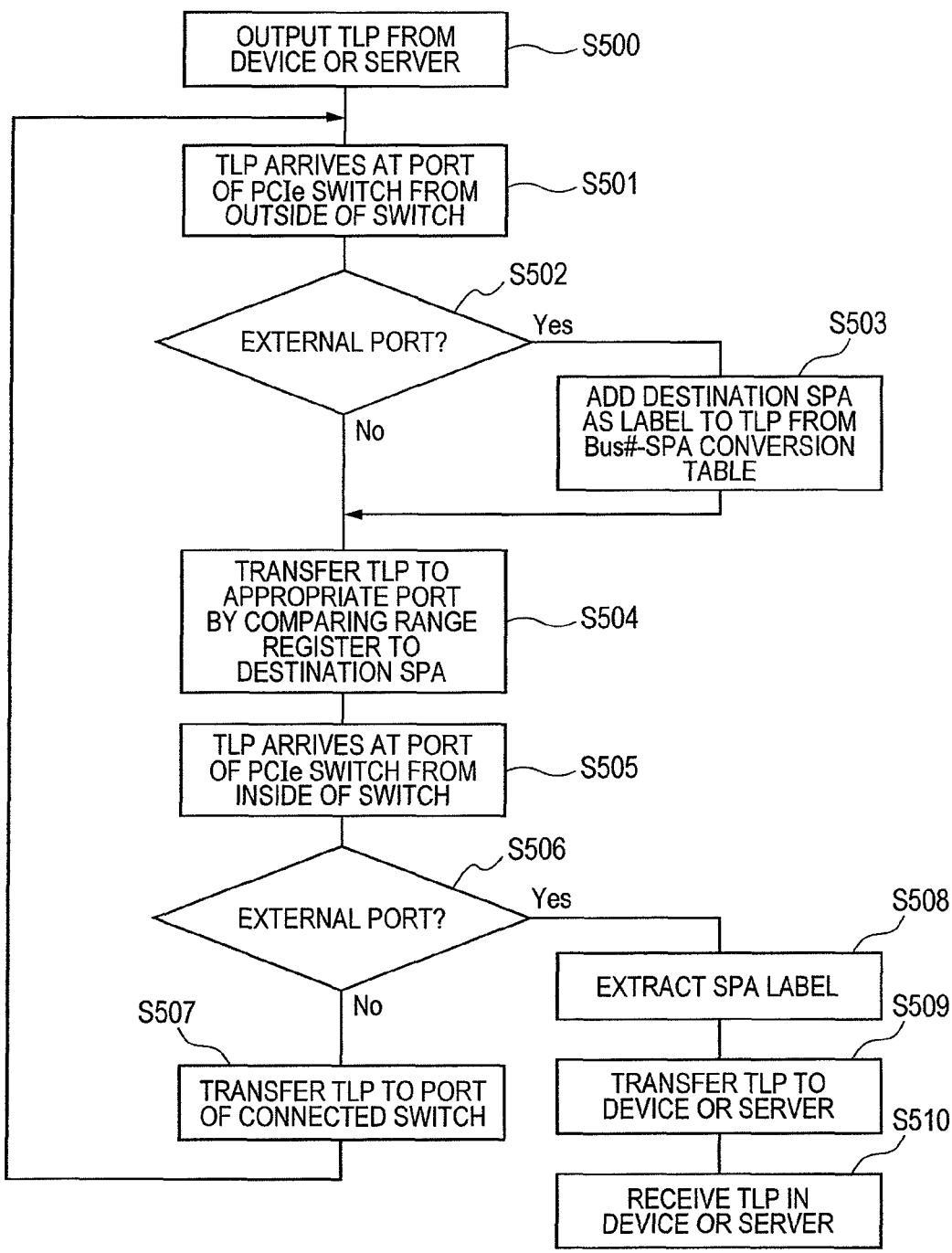
FIG. 5 is a flow chart of the control operation to route the TLP according to the embodiment.

Next, the routing control of TLP will be described with reference to FIG. 5. When a TLP is outputted from the server 101 (or the device 104) (S500), the TLP arrives at the port of the PCIe switch 103 from the outside (S501). Then, the PCIe switch 103 determines whether the port is the external port (S502). The assigned SPA is stored in the SPA storage register 302 of the external port, so that the PCIe switch 103 determines whether the port is the external port or the internal port by referring to the record of the SPA. As a result of the determination, if the port is the internal port (because the SPA is not stored) (S502, No), the arrived TLP is the TLP sent from the other PCIe switch. The destination SPA is already added to the TLP sent from the other PCIe switch. Thus, the internal port does not change the arrived TLP and proceeds to step S504.

On the other hand, as a result of the determination, if the port is the external port (S502, Yes), the TLP that arrived is the TLP sent from the server or the device. The destination SPA label 122 is not added to the TLP sent from the server or the device. Thus, the external port extracts the bus number by referring to the bus number field of the TLP, obtains the SPA corresponding to the extracted bus number by referring to the conversion table, and adds the obtained SPA to the TLP as a label (S503). Then, the external port proceeds to step S504.

In step S504, the PCIe switch 103 compares the range register 300 of each port to the destination SPA 122 of the TLP. As a result of the comparison, the PCIe switch 103 sends the TLP to the port in which the destination SPA 122 is included in the range indicated by the range register (S504). Then, the TLP arrives at the port of the PCIe switch from the inside of the switch (S505).

Upon arrival of the TLP at the port, the PCIe switch 103 determines whether the port is the external port (S506). Whether the port is the external port or not is determined by the same way as in step S502. As a result of the determination, if the port is the internal port (S506, No), it is connected to the internal port of the other switch. Thus, the PCIe switch 103 does not change the content of the TLP, and sends the TLP as it is to the internal port of the destination PCIe switch (S507). On the other hand, if the port is the external port (S506, Yes), the port is connected to the server or the device. Thus, the PCIe switch 103 removes the SPA 122 added to the TLP (S508) and sends the TLP to the destination device (or server) (S509). The destination device (or server) receives the TLP arriving from the external port (S510), and then the transfer operation of the TLP is completed.

Figure 6:
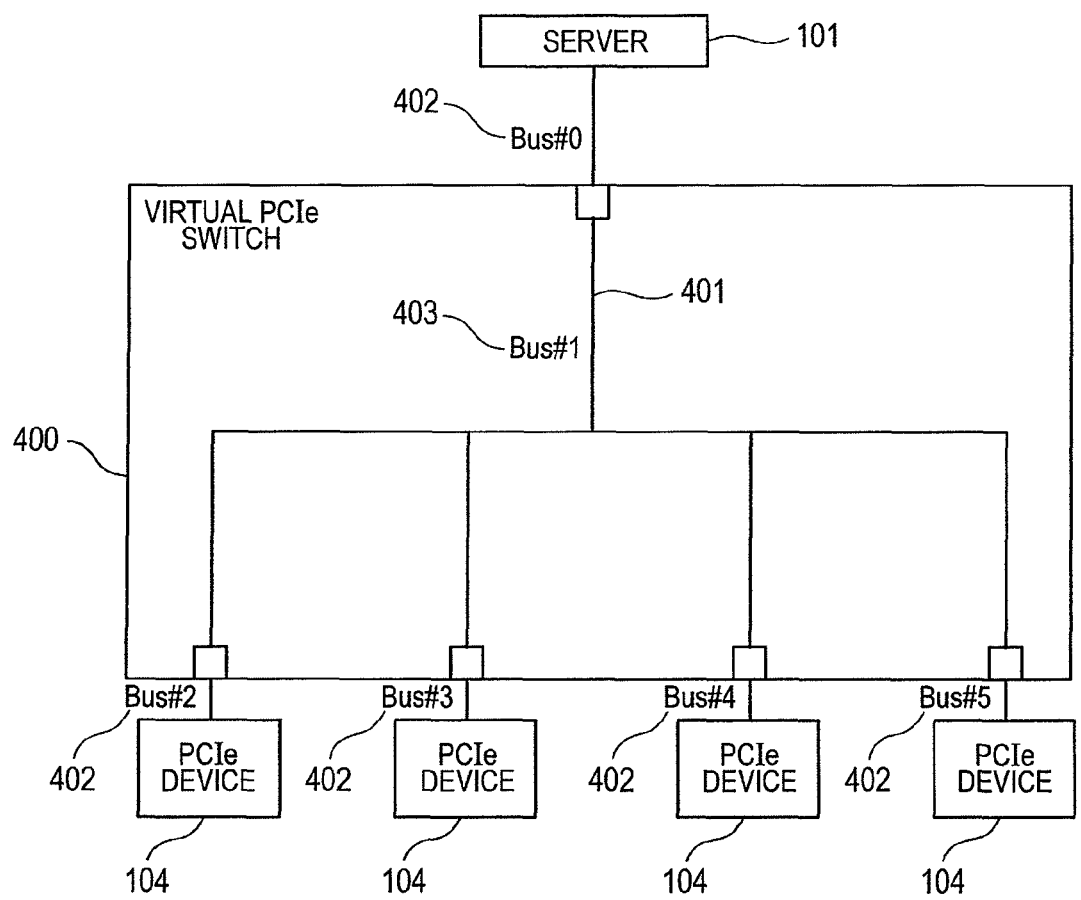
FIG. 6 is a view of the structure of a vertical switch that is visible to the software according to the embodiment.

FIG. 6 shows an example of the topology of a virtual PCIe bus seen from the software on the server as a result of the routing using the SPA. In order that the software on the server 101 can use the PCIe device without being aware of the SPA, it is necessary to make a virtual switch 400 visible to the server and the PCIe device. Further, the standard of the PCIe requires at least one bus present in the switch, so that a virtual bus 401 is provided within the switch. According to the standard of the PCIe switch, the upper limit of the number of bridges that can be connected to the internal bus of the switch is 32. The bridge in the PCI switch is connected to the PCIe device and the server by the PCIe bus, so that the upper limit of the number of PCIe devices and servers that can be connected by one PCIe switch by the PCIe bus is 32. However, actually it is often difficult to connect all 32 devices due to the limitation of the number of ports of the physical switch. In order to connect a large number of servers and devices, it is necessary to use a large number of physical switches, so that a large number of bus numbers are consumed within a physical switch and between physical switches. However, the virtual switch is free from the physical limitations, so that it is possible to connect up to 32 devices to a single virtual switch. This makes it possible to reduce the number of virtual switches relative to the number of physical switches. As a result, the number of buses can be reduced between the switches and within the switch. Thus, it is possible to minimize the consumption of the bus number 403 within the switch and between the switches, making it possible to use a larger number of bus numbers 402 the user wants to use. In this way, according to the present invention, it is possible to virtualize the switch only by adding a small change to the existing switch, without preparing a switch having a large number of ports. As a result, it is possible to minimize the bus number assigned to the bus within the switch and between the switches. Thus, the problem of the shortage of bus numbers can be solved.

In the packet routing using SPA, the management system 500 sets the range register so as to include the SPA of the external port present in the destination of the bus connected to the port. For this reason, the numbering method for the SPA is not necessarily free from the physical topology, an example of which is that the numbering of the SPA must be consistent with the setting of the range register. However, according to the present invention, there is no need for the software to be aware of the SPA by using the conversion table 301. Thus, when the numbering method for the bus number is free by the use of SPA, the virtual switch is made freely visible to the software. As a result, it is possible to reduce the assignment of the bus number to an unintended place.

Figure 7:
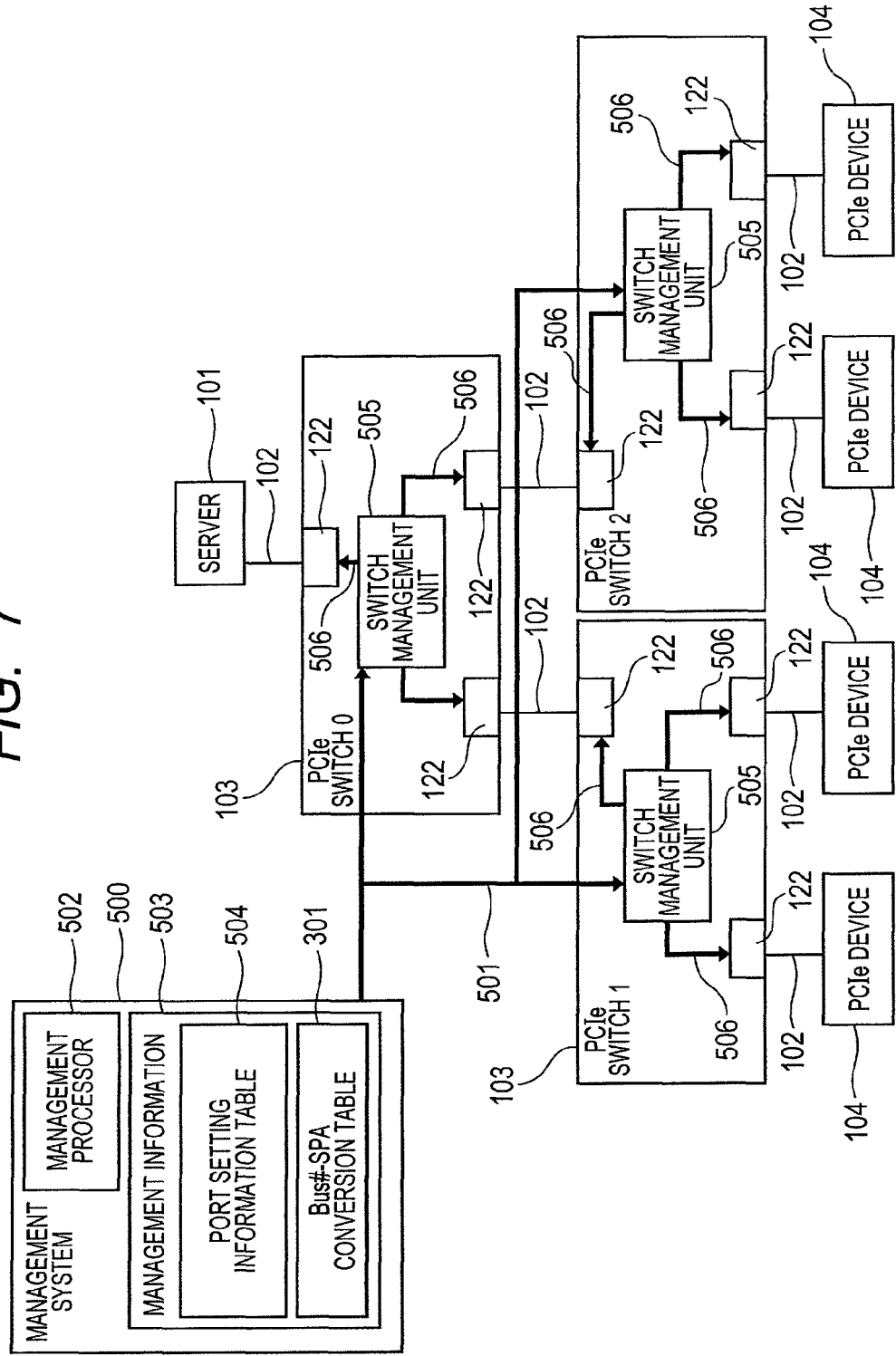
FIG. 7 is a view of a management system for performing the initial setting of the PCIe switches, as well as the structure of the path according to the embodiment.

FIG. 7 shows the management system for performing the initial setting of the PCIe switch, as well as the configuration of path for the management. The computer system 100 includes the management system 500 for the initial setting of the PCIe switch 103, in addition to the network of the PCIe bus 102 and the PCIe switch 103. The management system 500 is connected to the switch management unit 505 of each PCIe switch 103 through the path 501. The management system 500 is a computer having the management processor 502 and the management information 503. The management information is stored in the conversion table 302 and the port setting information table 504. Before the initial setting, whether the port of the PCIe switch is the external port or the internal port is not determined. Which of the two types of port is used is determined by the management information that is registered in the port setting information table 504 included in the management information 503 of the management system 500. The switch management unit 505 is connected to each port 122 by a path 506 for internal switch setting.

FIG. 8 shows an example of the structure of the management information in the management system. The management information 503 includes the conversion table 302 and the port setting information table 504. The conversion table 302 is the same as the conversion table set in each external port shown in FIG. 3. For example, the conversion table 302 can be common to all the external ports, so that a copy of the conversion table 302 is delivered to the individual ports of each PCIe switch 103 from the management system 503 through the path 501. The port setting information table 504 includes a physical switch number field 600, a port number field 601, an SPA field 602, and a range register setting information field 603. Here, the port (indicated by "-") for which the SPA field 602 is invalid is the internal port, while the port (in which the SPA is set) for which the SPA field 602 is valid is the external port.

Figure 9:
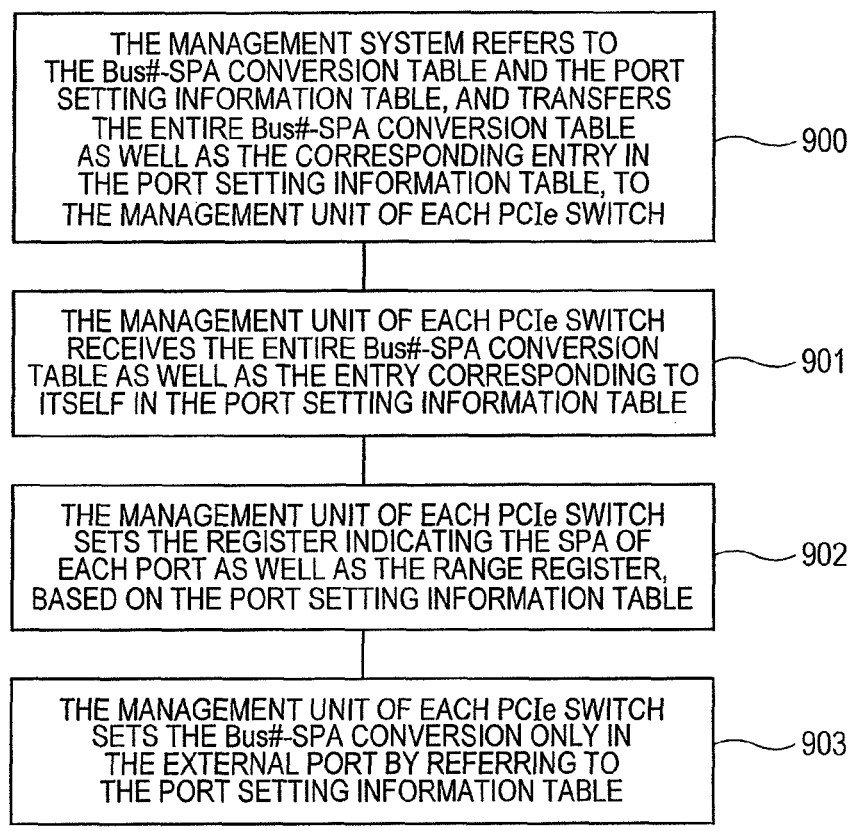
FIG. 9 is a flow chart of the control operation for the initial setting according to the embodiment.

Next, the control operation of the initial setting of the PCIe switch will be described with reference to FIG. 9. The management system 500 refers to the port setting information table 504, and sends the conversion table 302 as well as the entry corresponding to the switch management unit of each PCIe switch, to the switch management unit 505 of each PCIe switch through the path 501 (S900). The management unit 505 of each PCIe switch receives the port setting information table 504 and the entry corresponding to itself in the conversion table 302, which are sent from the management system 500 (S901). Then, the management unit 505 of each PCIe switch sets the register 302 indicating the SPA of each port, as well as the range register 300 based on the information of the port setting information table. The management unit 505 of each PCIe switch sets the conversion table 302 only for the external port by referring to the port setting information table (S903). Whether the port is the external port is determined by the fact whether or not the SPA field 602 of the port setting information table is valid.

Next, some other embodiments will be described.

Second Embodiment

Figure 10:
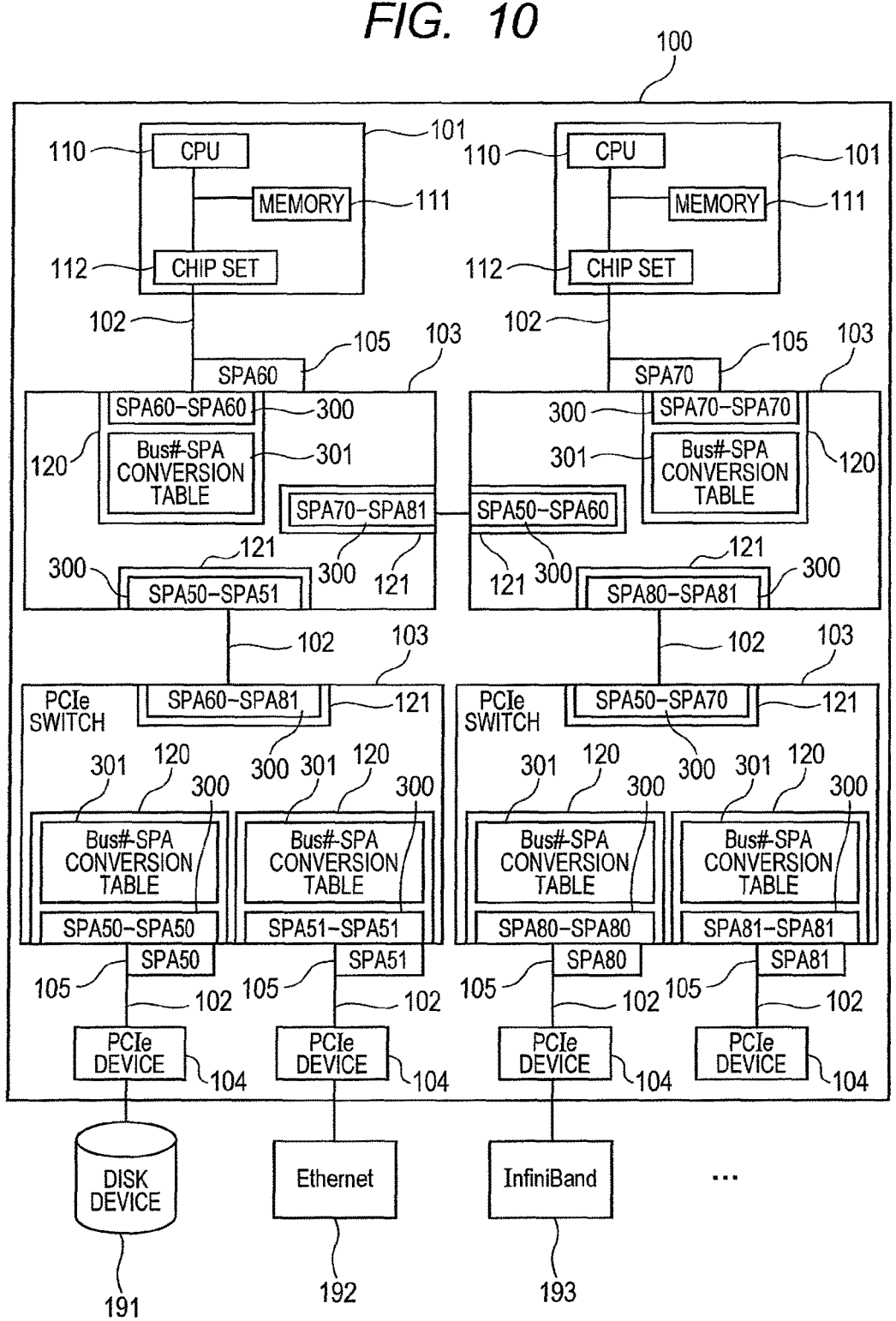
FIG. 10 is a block diagram of a computer system according to another embodiment (second embodiment).

In the computer system 100 in this embodiment shown in FIG. 10, the configuration is different from the computer system shown in FIG. 1 in that the computer system 100 includes a plurality of servers 101, and uses different conversion tables (in which different SPAs not overlapping each other are set for each bus number) 301 for each of the external ports 120 to which the servers 101 are connected.

(Note that the same parts as in FIG. 1 are designated by the same reference numerals.) Since each external port 120 has different conversion table 301, even if the destination bus numbers of TLPs outputted from different servers 101 are the same, different destination SPAs are added to the TLPs as the labels. For this reason, different virtual PCIe topologies are made visible to the software on each of the servers. The upper limit of the bus number that can be handled by each virtual PCIe topology is 256. However, it is possible to handle 256 or more devices in the whole computer system by using a plurality of PCIe topologies.

Third Embodiment

Figure 11:
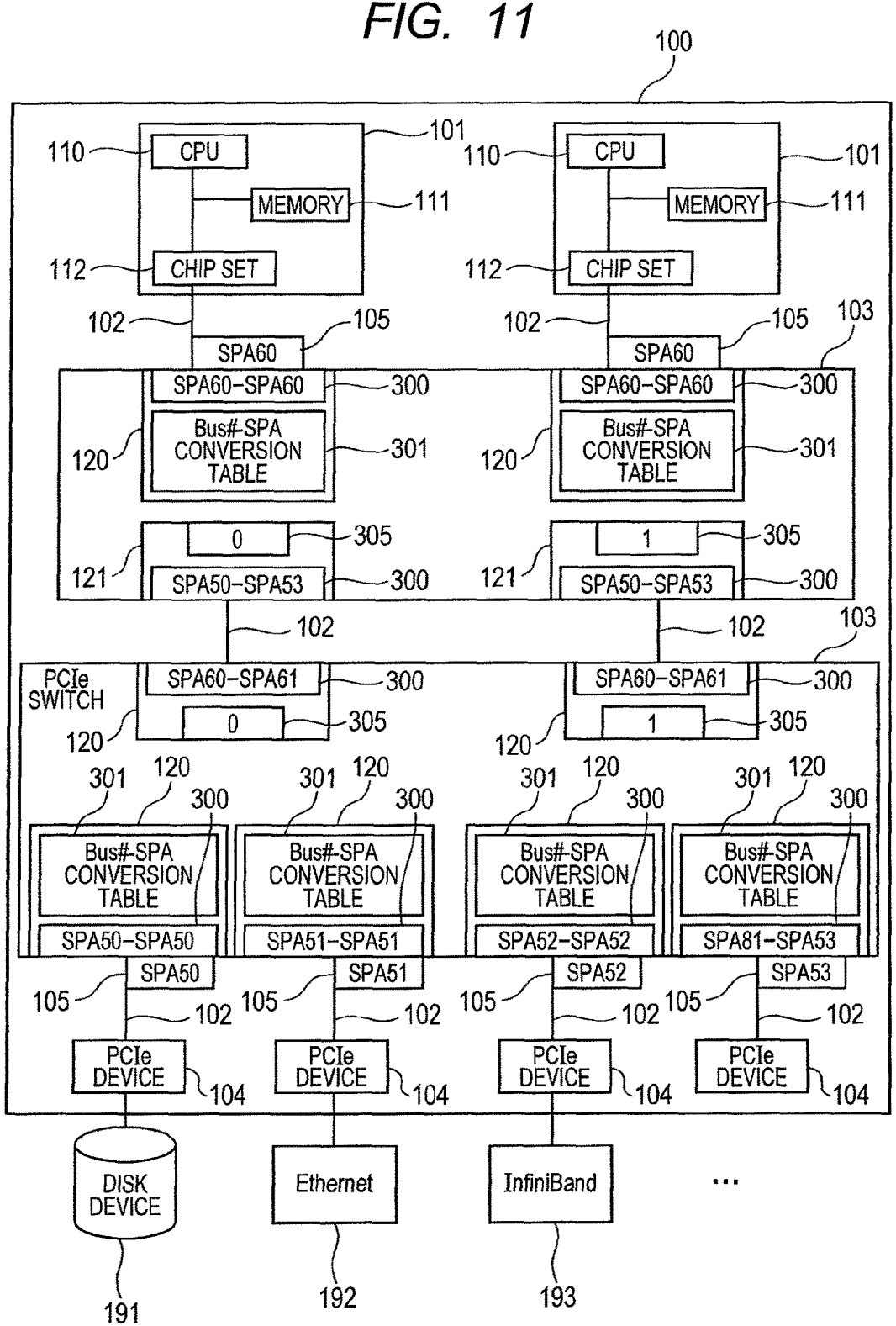
FIG. 11 is a block diagram of a computer system according to still another embodiment (third embodiment).
Figure 12:
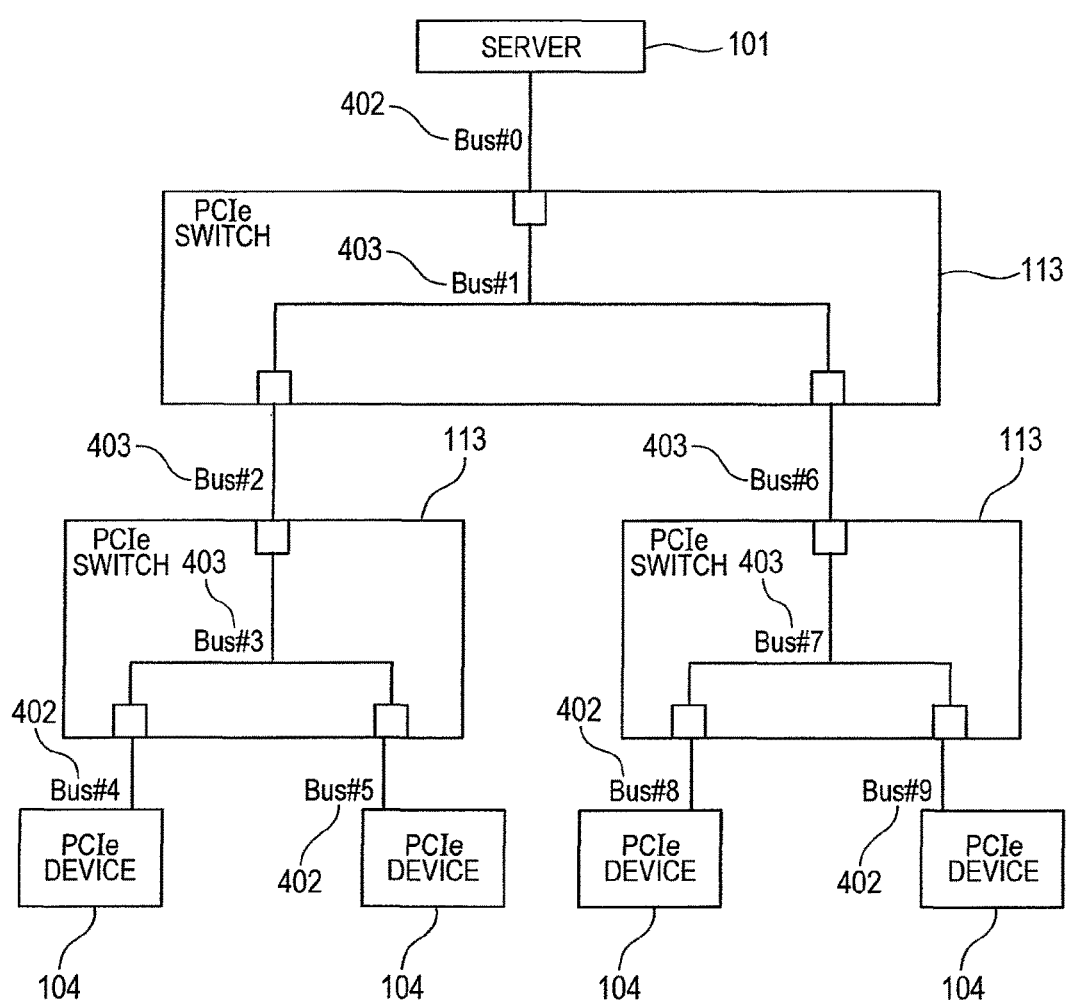
FIG. 12 is a view of an example of the configuration of a conventional PCIe switch network.

In the computer system 100 in this embodiment shown in FIG. 11, the configuration is different from the computer system shown in FIG. 1 in the following aspects: One common PCIe switch 1031 and one common PCIe switch 1032 are connected to a plurality of servers 101; the PCIe switches 1031 and 1032 are connected to each other by a plurality of PCIe buses 102; and a register 305 in which integers can be stored is provided in the internal port 121. (Note that the same parts as in FIG. 1 are designated by the same reference numerals.)

The integers to be stored in the register 305 are in the range from "0" to (the number of PCIe buses 102 between PCIe switches minus 1), which are assigned so as not to overlap each other by the register 305 of the internal port 121 of one PCIe switch 103 connected to each PCIe bus 102. Further, the same value is assigned to the range register 300 of each of the internal ports.

In the first embodiment, the condition that the internal port allows the TLP to pass through from the inside of the switch to the outside is the fact that the destination SPA of the TLP is in the range of values indicated in the range register 300. In the present embodiment, the following condition is also added to the condition in the first embodiment. That is, the remainder of the destination SPA divided by a certain integer is equal to the value stored in the register 305. Here, the certain integer is the number of PCIe buses between the PCIe switches. According to the condition of integers assigned to the register 305, the TLP is allowed to pass through one of a plurality of internal ports. The pair of the range register 300 and the register 305 for storing integers indicates a set of SPAs used for determining the port to which the TLP with the destination SPA is to be sent. In other words, this is a kind of SPA set selection means.

In the internal port 121 according to the first embodiment, the range indicated in the range register 305 should not overlap. On the other hand, the range of the destination SPA of the TLP transmitted from a certain server 101 is very likely to be concentrated in close values. Thus, even if the PCIe switches are connected by a plurality of PCIe buses in order to increase the transfer efficiency between two PCIe switches 103, when the internal port 121 of the first embodiment is used, a large number of TLPs are likely to pass through only a specific PCIe bus, so that the effect of connecting the plurality of PCIe buses between the switches may be reduced.

On the other hand, in the internal port 121 according to the present embodiment, the condition that the remainder of the destination SPA divided by a certain integer is equal to the value of the register 305 is added to the condition of allowing the TLP to pass through from the inside of the switch to the outside. Thus, the values of the range register 300 can overlap the range register of the other internal port. For this reason, if the destination SPAs of TLPs transmitted from a certain server 101 are concentrated, it is possible to equally distribute the TLPs to the individual PCIe buses by the remainder of the divided destination SPAs. As a result, the load balancing of the PCIe bus can be achieved, and the effect of connecting two PCIe switches by a plurality of PCIe buses can be increased.

LIST OF REFERENCE SINGS

100: Computer system, 101: Server, 102: PCIe bus, 103: PCIe switch, 104: PCIe device, 105: CPU, 111: Memory, 112: Chip set, 120: External port, 121: Internal port, 19: I/O device, 200: TLP, 201: Transaction layer packet body, 202: TLP Prefix, 203: Bus number field, 204: SPA field, 300: Range register, 301: Conversion table, 302: SPA storage register, 303: Bus number field, 304: SPA field, 400: Virtual PCIe switch, 401; Virtual PCIe bus, 402: Bus number of the bus connecting the switch and the server, or the switch and the PCIe device, 403: Bus number of the bus connecting within the switch or between the switches, 500: Management system, 501: Path for initial setting, 502; Management processor, 503: Management information, 504: Port setting information table, 505: Switch management unit, 506: Path for internal switch setting, 600: Physical switch number field, 601: Port number field, 602: SPA field, 603: Range register setting information field

The invention claimed is:

1. A computer system in which a server and one or more devices are connected to each other by a plurality of PCIe switches each having a plurality of ports, the computer system sending packets between the server and the one or more devices through the plurality of ports of the plurality of PCIe switches, the plurality of ports include internal ports connecting the plurality of PCIe switches, an external port connected to the server, and an external port connected to one of the one or more devices, the external ports each including:
a storage unit configured to store a system port address (SPA) in the computer system, the SPA being uniquely assigned to the external port;
a conversion component configured to manage an association between a destination bus number and the SPA; and
a SPA set setting component configured to set a set of SPAs, the internal ports each include a storage unit in which the SPA is not held, and a SPA set setting component configured to set the set of SPAs, wherein, when a port receives a packet holding at least a destination bus number from outside of the plurality of PCIe switches:
if the packet receiving port is an external port, the packet receiving port's PCIe switch refers to the packet receiving port's conversion component and obtains the SPA associated with the destination bus number held by the packet, adds the obtained SPA to the packet, and sends the packet to a destination port included in the destination of the SPA using the SPA added to the packet to determine the set of SPAs specified by the packet receiving port's SPA set setting component, and
if the packet receiving port is an internal port, the packet receiving port's PCIe switch sends the packet to the destination port included in the destination of the SPA by using the SPA added to the packet to determine the set of SPAs specified by the SPA set setting component, wherein, when the packet receiving port receives the packet from inside of the one of the plurality of PCIe switches:
  if the packet receiving port is an external port, the packet receiving port's PCIe switch removes the SPA added to the packet, and sends the packet to the server or one of the one or more devices connected to the packet receiving external port, based on the destination bus number held by the packet, and
  if the packet receiving port is an internal port, the packet receiving port's PCIe switch sends the packet to an internal port of another one of the plurality of PCIe switches connected to the packet receiving internal port.

2. The computer system according to claim 1,
wherein the set of SPAs specified by the SPA set setting component is in a range of SPAs to be destinations of packets that can pass through the packet receiving external port from inside of its PCIe switch to outside of its PCIe switch, and
wherein one or more of the plurality of ports is identified as an the external port using a register for storing the SPA indicating the external port.

3. The computer system according to claim 1, wherein contents of the conversion components, the SPA set setting components, and the registers for storing the SPAs are set in an initial setting by a management system connected by the plurality of PCIe switches.

4. The computer system according to claim 1,
wherein, a port (first port) of one switch (first switch) is connected to a port (second port) of another switch (second switch),
wherein when a switch other than the first switch is connected to the second switch, the set of SPAs is set to the SPA set setting component of the first port, to include the SPA of the ports of the second switch and a next switch,
wherein when a switch other than the first switch is not connected to the second switch, the set of SPAs is set to the SPA set setting component of the first port, to include the SPA of the port of the second switch, and
wherein when a packet with a destination SPA included in the set of SPAs set by the SPA set setting component of the first port is input to the first switch, the first switch sends the packet with the destination SPA to the second switch by allowing the packet with the destination SPA to pass through the first port and then through the second port.

5. The computer system according to claim 1,
wherein the computer system includes a plurality of servers,
wherein an accessible set including a plurality of external ports is defined within the computer system for each server.

6. The computer system according to claim 5, wherein the plurality of external ports is included in a plurality of accessible sets, so that a device connected to one of the external ports transmits and receives the packet to and from the plurality of servers.

7. The computer system according to claim 1,
wherein the SPA and the destination bus number are represented in binary numbers, and
wherein the binary number representing the SPA is set higher than the binary number of the bits representing the destination bus number, enabling connection of a larger number of devices and a larger number of servers as a single computer system.

8. The computer system according to claim 1,
wherein, for each port of the plurality of ports, whether the port is the external port or the internal port is determined by referring to the storage unit of the port, and
wherein the port is the external port when the SPA is stored in the port, and the port is the internal port when the SPA is not stored in the port.

9. The computer system according to claim 1, wherein the SPA set setting component is a set of SPAs used for determining the one or more of the plurality of ports to which the packet with the SPA is to be sent.

10. A packet routing control method in a computer system for sending packets between a server and one or more devices by a plurality of PCIe switches each having a plurality of ports,
wherein the plurality of the ports include internal ports connecting the plurality of PCIe switches to each other, an external port connected to the server, and an external port connected to one of the one or more devices,
the external ports each including:
  a storage unit configured to store a system port address (SPA) in the computer system, the SPA being uniquely assigned to the external port;
  a conversion component configured to manage an association between a destination bus number and the SPA; and
  a SPA set setting component configured to set a set of SPAs,
the internal ports each include a storage unit in which the SPA is not held, and a SPA set setting component configured to set the set of SPAs, the method comprising:
  a port receiving a packet holding at least a destination bus number from outside the packet receiving port's PCIe switch:
    if the packet receiving port is an external port, the packet receiving port's PCIe switch refering to the packet receiving port's conversion component and obtaining the SPA associated with the destination bus number held by the packet, adding the obtained SPA to the packet, and sending the packet to a destination port included in the destination of the SPA using the SPA added to the packet to determine the set of SPAs specified by the packet receiving port's SPA set setting component, or
    if the packet receiving port is an internal port, the packet receiving port's PCIe switch sending the packet to the destination port included in the destination of the SPA by using the SPA added to the packet to determine the set of SPAs specified by the SPA set setting component,
  and
  the packet receiving port receiving a packet from inside the packet receiving port's PCIe switch,
    if the packet receiving port is an external port, the packet receiving port's PCIe switch removing the SPA added to the packet, and sending the packet to the server or one of the one or more devices connected to the packet receiving external port, based on the destination bus number held by the packet, or
    if the packet receiving port is an internal port, the packet receiving port's PCIe switch sending the packet to an internal port of another one of the plurality of PCIe switches connected to the packet receiving internal port.

11. The routing control method according to claim 10, wherein a routing control method obtains the SPA from the destination bus number held by the packet arriving at the external port, by referring to a conversion table prepared in advance in the external port, the conversion table having a plurality of pairs of destination bus numbers and SPAs registered therein.

12. The routing control method according to claim 10, wherein when the packet arrives at an external port to which a target server or one of the one or more devices is connected, a routing control method removes the SPA added to the packet, and then sends the packet to the server or the one device connected to the external port.

13. The routing control method according to claim 10, wherein the association between the SPA and the destination bus number is set in an initial setting by a management system connected to the plurality of PCIe switches.

* * * * *